United States Patent [19]
Wandel et al.

[11] Patent Number: 6,038,932
[45] Date of Patent: *Mar. 21, 2000

[54] AIRCRAFT PITOT AND STATIC PRESSURE SENSING DEVICE AND AIRCRAFT HAVING THE SENSING DEVICE

[75] Inventors: Hermann Wandel, Unterhaching; Michael Jost, Grünwald; Helmut Sommer, Nidderau; Robert Fischer-Wilk, Frankfurt am Main, all of Germany

[73] Assignees: Nord-Micro Elektronik Feinmechanik AG, Frankfurt am Main; Daimler Chrysler AG, Stuttgart, both of Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/942,224

[22] Filed: Oct. 1, 1997

[30] Foreign Application Priority Data

Oct. 1, 1996 [DE] Germany .......................... 196 40 606

[51] Int. Cl.⁷ .............................. G01F 1/46; G01C 21/00
[52] U.S. Cl. ..................... 73/861.65; 73/861.68; 73/182
[58] Field of Search ............................ 73/861.65, 861.66, 73/861.68, 182, 170.08, 170.09, 170.26

[56] References Cited

U.S. PATENT DOCUMENTS

| | | |
|---|---|---|
| 3,079,758 | 3/1963 | Vogel et al. . |
| 3,262,316 | 7/1966 | Hansen et al. . |
| 3,318,146 | 5/1967 | De Leo et al. . |
| 3,428,270 | 2/1969 | Knight et al. .......................... 73/861.65 |
| 4,378,696 | 4/1983 | DeLeo et al. .......................... 73/861.65 |
| 5,025,661 | 6/1991 | McCormack . |
| 5,099,686 | 3/1992 | Köhler ................................. 73/861.65 |
| 5,438,880 | 8/1995 | Washburn ............................. 73/861.65 |

FOREIGN PATENT DOCUMENTS

| | | |
|---|---|---|
| 464474 | 4/1950 | Canada ............................... 73/861.68 |
| 0 229 534 A2 | 7/1987 | European Pat. Off. . |
| 2 395 499 | 1/1979 | France . |
| 1 297 921 | 6/1969 | Germany . |
| 2 138 495 | 2/1973 | Germany . |
| 42 07 951 A1 | 9/1993 | Germany . |

OTHER PUBLICATIONS

International Patent Application WO 89/02061 (Hagen et al.), dated Mar. 9, 1989.

*Primary Examiner*—Harshad Patel
*Attorney, Agent, or Firm*—Herbert L. Lerner; Laurence A. Greenberg; Werner H. Stemer

[57] ABSTRACT

An aircraft pitot and static pressure sensing device and an aircraft having the sensing device, more particularly a fighter aircraft, include a plurality of pressure sensors disposed in a radome of the aircraft. In addition, a plurality of air intake ports is provided in the radome. The air intake ports are connected through connecting passages to the pressure sensors.

27 Claims, 4 Drawing Sheets

AIRCRAFT PITOT AND STATIC PRESSURE SENSING DEVICE AND AIRCRAFT HAVING THE SENSING DEVICE

BACKGROUND OF THE INVENTION

Field of the Invention

The present invention relates to an aircraft pitot and static pressure sensing device, more particularly for a fighter aircraft. The present invention also relates to an aircraft having the sensing device.

In sensing devices of the aforementioned kind, a pitot tube for pressure sensing is provided which is secured, for example, to the fuselage of an aircraft as an external component. The pressures sensed in the pitot tube furnish information as to various air data parameters, such as altitude and speed. Angle of attack or side-slip of the aircraft is usually sensed with wind vanes. Pitot tubes or wind vanes that are disposed externally have various disadvantages and it is thus possible, for instance, that when the aircraft has a high angle of attack the sensing device no longer functions reliably or may even cease functioning altogether under extreme conditions. One of the reasons therefor results from the fact that when the aircraft is subject to a high angle of attack large changes in the incident flow occur at the pitot tube relative to its pressure sensing port. A further drawback in the external configuration is that the pitot tube and the wind vanes can be "seen" by radar. In addition, external components have an unfavorable influence on the aerodynamic streamlining of the aircraft fuselage.

SUMMARY OF THE INVENTION

It is accordingly an object of the invention to provide an aircraft pitot and static pressure sensing device and an aircraft having the sensing device, which overcome the hereinafore-mentioned disadvantages of the heretofore-known devices of this general type and which safely and reliably functions even in the case of high angles of attack of an aircraft.

With the foregoing and other objects in view there is provided, in accordance with the invention, an aircraft pitot and static pressure sensing device, more particularly for a fighter aircraft, comprising a multiplicity of pressure sensors disposed in a radome of the aircraft; a multiplicity of air intake ports disposed in the radome; and connecting passages connecting the air intake ports to the pressure sensors.

The first advantage achieved by configuring the sensing device in such a way is that there is no longer any need for such components to be secured externally to the fuselage of the aircraft. In accordance with the present invention all components relative to the sensing device can be integrated in the radome of the aircraft, thus advantageously eliminating such components that can be detected by radar. In addition thereto, the streamlining conditions on the fuselage of the aircraft are additionally improved since components having an unfavorable aerodynamic influence are integrated in the radome of the fuselage.

The sensing device in accordance with the invention may be used in both manned and unmanned aircraft.

In accordance with another feature of the invention, the air intake ports are provided in the wall of the radome and offset about the periphery and/or in the longitudinal direction of the radome. This appropriate geometric configuration of the air intake ports in the radome ensures that the pitot and static pressures are safely and reliably sensed even when the angle of attack greatly changes relative to the reference axes of the air intake ports.

In accordance with a further feature of the invention, the pressure sensors are disposed in a circular disk magazine, and the pressure sensors may be configured cylindrically. Preferably, eleven pressure sensors are provided in the circular disk magazine.

In accordance with an added feature of the invention, each pressure sensor is connected through one or more connecting passages to each air intake port. In this configuration the connecting passages may be configured in accordance with the invention as connecting tubes and/or drilled passages.

In accordance with an additional feature of the invention, the pressure sensors include a basebody having at least one $C_R$ electrode and one $C_P$ electrode, a spacer, as well as a diaphragm with an opposing electrode. In this configuration the basebody, the spacer and the diaphragm are preferably made of a ceramics material. In the pressure sensor in accordance with the invention a pressure acting on the diaphragm is converted into an electric signal which can be suitably processed further.

In accordance with yet another feature of the invention, the pressure sensors are connected to an electronic analyzer for further processing of the resulting signals.

In accordance with yet a further feature of the invention, the electronic analyzer includes a redundant structure and may be disk-shaped and disposed in the immediate surroundings of the pressure sensors in the radome.

In accordance with yet an added feature of the invention, the electronic analyzer includes at least one microprocessor for processing signals from the pressure sensors as well as a signal converter connected to the microprocessor for converting electric signals from the microprocessor into optical signals.

Through the use of the configuration of the electronic analyzer in accordance with the invention, all air data parameters can be derived from the sensed pitot and static pressures by real-time related algorithmic processing in the microprocessor of the electronic analyzer. These air data parameters are, for example, altitude, speed, Mach number, angle of attack or side-slip of the aircraft. Converting these electric signals into optical signals within the electronic analyzer has the advantage of preventing the sensing device in accordance with the invention from influencing other instruments or being influenced by other instruments. Thus, for example, the radar system of the aircraft may be accommodated in the immediate vicinity of the sensing device. It is possible, for example, to place the sensing device in the forward region of the radome while the radar system is accommodated in the rear region of the radome. This requires the signals produced in the sensing device to be routed past the radar system. Electrical output signals of the sensing device could possible negatively influence the radar system.

In accordance with yet an additional feature of the invention, the sensing device includes a heater having a heating element for heating the radome and the air intake ports, as well as at least one heating conductor connected to the heating element.

In accordance with again another feature of the invention, the heating conductor is passed through the circular disk magazine for the pressure sensors and the electronic analyzer, with through-holes being correspondingly provided for this purpose in the magazine and the electronic analyzer.

In accordance with again a further feature of the invention, the heater is an electric heater.

The heater in accordance with the present invention has the task of preventing the radome and the air intake ports from icing up. Preferably, the temperature of the radome can be regulated and monitored.

In accordance with again an added feature of the invention, the combination of differing materials in the radome can prevent the radome of the aircraft from being susceptible to erosion. Corrosion of the radome can thus be avoided in the case of metallic materials.

In accordance with again an additional feature of the invention, the radome is connected to the fuselage of the aircraft by a Teflon bush.

In accordance with still another feature of the invention, the radome is configured in such a way that it acts according to the principle of a Faraday cage relative to the sensing device, so that the sensing device is insensitive to high frequencies.

In accordance with a concomitant feature of the invention, the radome is configured in such a way that lightning currents produced by a lightning strike are conducted through the radome, thus rendering the sensing device safe from a lightning strike.

In accordance with the present invention, a sensing device is defined for sensing pitot and static pressures in an aircraft which safely and reliably functions irrespective of the angle of attack of the aircraft. The integrated configuration of the sensing device within the radome of the aircraft permits external components, as are provided for in prior art sensing devices, to be eliminated, as a result of which the number of such components which can be detected by radar is further reduced. Since the sensing device in accordance with the invention together with the other components are accommodated within the radome of the aircraft, it is assured by the configuration of the individual components in accordance with the invention that the sensing device as well as the other instruments are unable to influence each other. More particularly, the invention avoids the radar system being influenced by the sensing device. Due to the restricted space availability within the radome, the radar system may be disposed in the immediate vicinity of the sensing device. Converting the electric signals into optical signals prevents the signals output by the sensing device from being able to influence the sensitive radar system. In addition to these procedures, absorber cones may be integrated in the sensing device as a result of which reflections to the radar antenna can be further reduced.

Optically transmitting the data generated by the sensing device furthermore has the advantage of reducing the required number of conductors, resulting from the fact that optically decoupled signals differing in intensity can be sent through one and the same conductor. This also reduces the structural complications in the sensing device in accordance with the invention.

Constructing the radome of material which is resistant to erosion and corrosion furthermore causes any lightning strike to the radome to be conducted directly through the surface of the radome. In addition thereto, lightning tubes may be provided in the fuselage of the aircraft in the region of an interface between the radome and the fuselage, which instantly conduct the energy of a lightning strike, thus preventing the sensitive sensing device from being damaged by a lightning strike.

Other features which are considered as characteristic for the invention are set forth in the appended claims.

Although the invention is illustrated and described herein as embodied in an aircraft pitot and static pressure sensing device and an aircraft having the sensing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
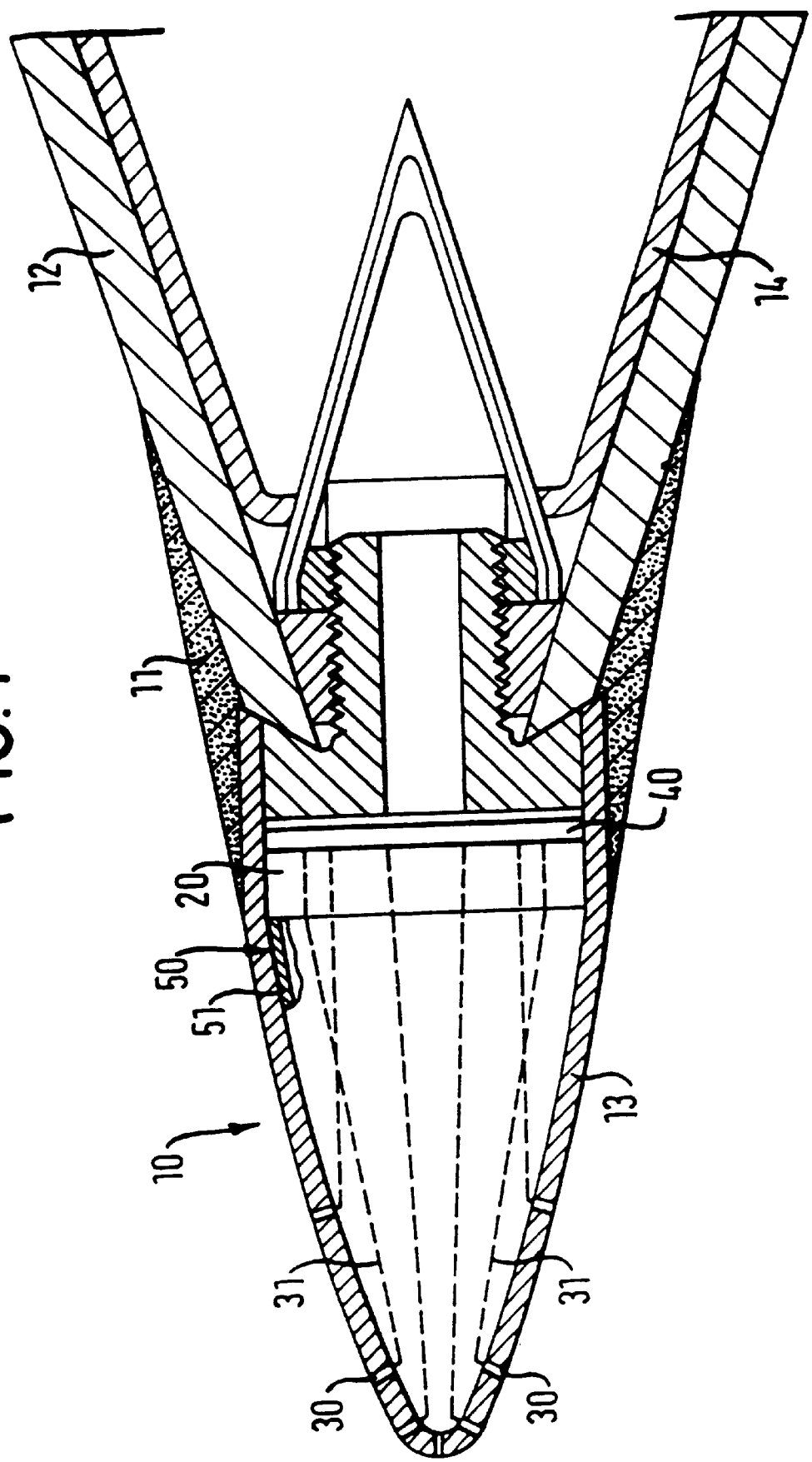
FIG. 1 is a fragmentary, diagrammatic, cross-sectional view of a radome for a fighter aircraft including a sensing device in accordance with the invention.

Referring now to the figures of the drawings in detail and first, particularly, to FIG. 1 thereof, there is seen a radome 10 of a fighter aircraft. The radome 10 is connected at an outer side thereof by a Teflon bush 11 to a fuselage 12. The radome 10 is configured mainly as a hollow body defined by a wall 13. A device for sensing pitot and static pressures is disposed within the radome 10.

Figure 3:
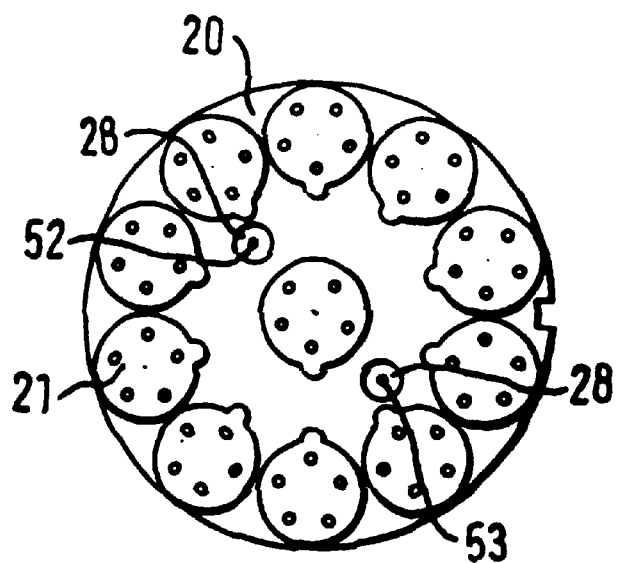
FIG. 3 is a plan view of a circular disk magazine for mounting pressure sensors.

As is shown in FIG. 1 the sensing device substantially includes a magazine 20 for pressure sensors, an electronic analyzer 40 as well as a plurality of air intake ports 30 provided in the wall 13 of the radome 10. The air intake ports 30 are connected through connecting passages 31 to pressure sensors 21 disposed on the circular disk magazine 20, as is seen in FIG. 3. In order to simplify the illustration, the connecting passages 31 are indicated merely by broken lines in FIG. 1.

FIG. 1 furthermore shows a heater 50 having a heating element 51 disposed in front of the magazine 20 for the pressure sensors 21, on an inner surface of the wall 13 of the radome 10. The heating element 51 is in direct contact with the wall 13 of the radome 10. The heater 50 is intended, more particularly, to prevent the air intake ports 30 and the connecting passages 31 from icing up.

In conclusion, FIG. 1 shows lightning conductor tubes 14 in the radome 10 of the fighter aircraft. These lightning conductor tubes 14 have the task of directly arresting lightning strikes striking the radome 10. Lightning currents generated by lightning strokes striking the radome 10 are initially arrested over the surface of the radome 10. These lightning currents are then transmitted to the lightning conductor tubes 14 in an interface from the radome 10 to the fuselage 12 of the aircraft. In this way lightning strokes striking the radome 10 are prevented from damaging the sensing device and other non-illustrated instruments installed within the radome 10.

Figure 2:
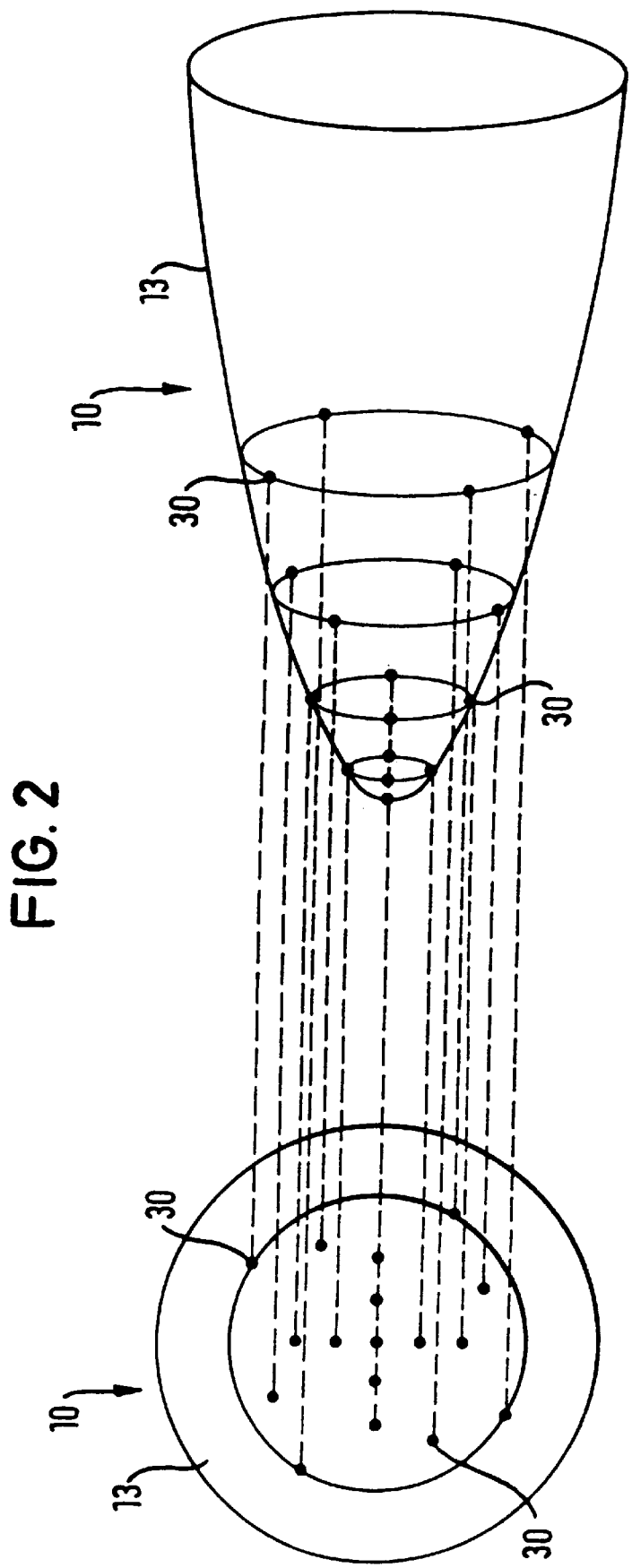
FIG. 2 includes a side-elevational view and a front-perspective view of a radome in which a plurality of air intake ports is configured.

FIG. 2 illustrates the way in which the air intake ports 30 are disposed in the wall 13 of the radome 10. It will be appreciated from this figure that the air intake ports 30 in the present exemplary embodiment are provided both around the periphery and in the longitudinal direction of the radome 10 and are offset in the wall 13 of the radome 10. It is to be noted that the geometric configuration of the air intake ports 30 as shown in FIG. 2 is intended to be merely illustrative, i.e. any other configuration is just as possible. As is evident from FIG. 2, the air intake ports 30 are distributed over an expansive region of the radome 10. This configuration assures that both the pitot pressure and the static pressure can be safely and reliably sensed for large angles of attack of the fighter aircraft, i.e. for large changes in a direction of incident flow relative to references axes of the air intake ports 30.

Figure 4:
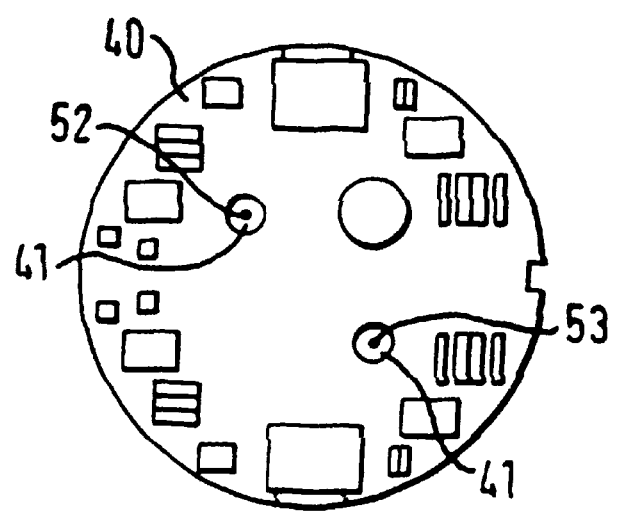
FIG. 4 is a plan view of a disk-shaped electronic analyzer unit.

FIGS. 3 and 4 respectively show a circular disk magazine 20 for mounting the pressure sensors 21 and a circular disk-shaped electronic analyzer 40, in a plan view.

As is particularly evident from FIG. 3, a total of eleven pressure sensors 21 is disposed on the circular disk magazine 20. It is again emphasized that this number of pressure sensors is purely illustrative. Heating conductors 52, 53 are guided through through-holes 28 provided within the circular disk magazine 20. These heating conductors 52, 53 are a component of the heater 50 and lead to the heating element 51 shown in FIG. 1. Passing the heating elements 52, 53 through the through-holes 28 of the circular disk magazine 20 has the advantage of permitting the complete cross-section of the radome 10 to be made use of to mount the circular disk magazine 20, thus optimally exploiting the space available within the radome 10 for mounting the pressure sensors 21.

As is evident from FIG. 4, through-holes 41 are provided within the electronic analyzer 40 for the same reason. These through-holes 41 furthermore serve to pass the heating conductors 52, 53 through the electronic analyzer 40. The electronic analyzer 40 contains all of the components which are necessary to analyze signals generated in the pressure sensors 21 with regard to the sensed pitot and static pressure from which all of the necessary air data parameters can be computed. Microprocessors 42 and signal converters 43 that are capable of converting the electric signals into optical signals also belong to the assembly of the components which are necessary for this purpose, but are not described in more detail in the present description.

As is particularly evident from FIG. 1, the electronic analyzer 40 and the magazine 20 for the pressure sensors 21 are directly associated to form a compact module in which the received pressure data can be immediately processed and transformed into optical signals. Preferably, the module including the electronic analyzer 40 and the magazine 20 forms a termination of the radome 10, as a result of which, on one hand, the space required for the sensing device is reduced and, on the other hand, any electric signals being output are prevented from interfering with other instruments.

Figure 5:
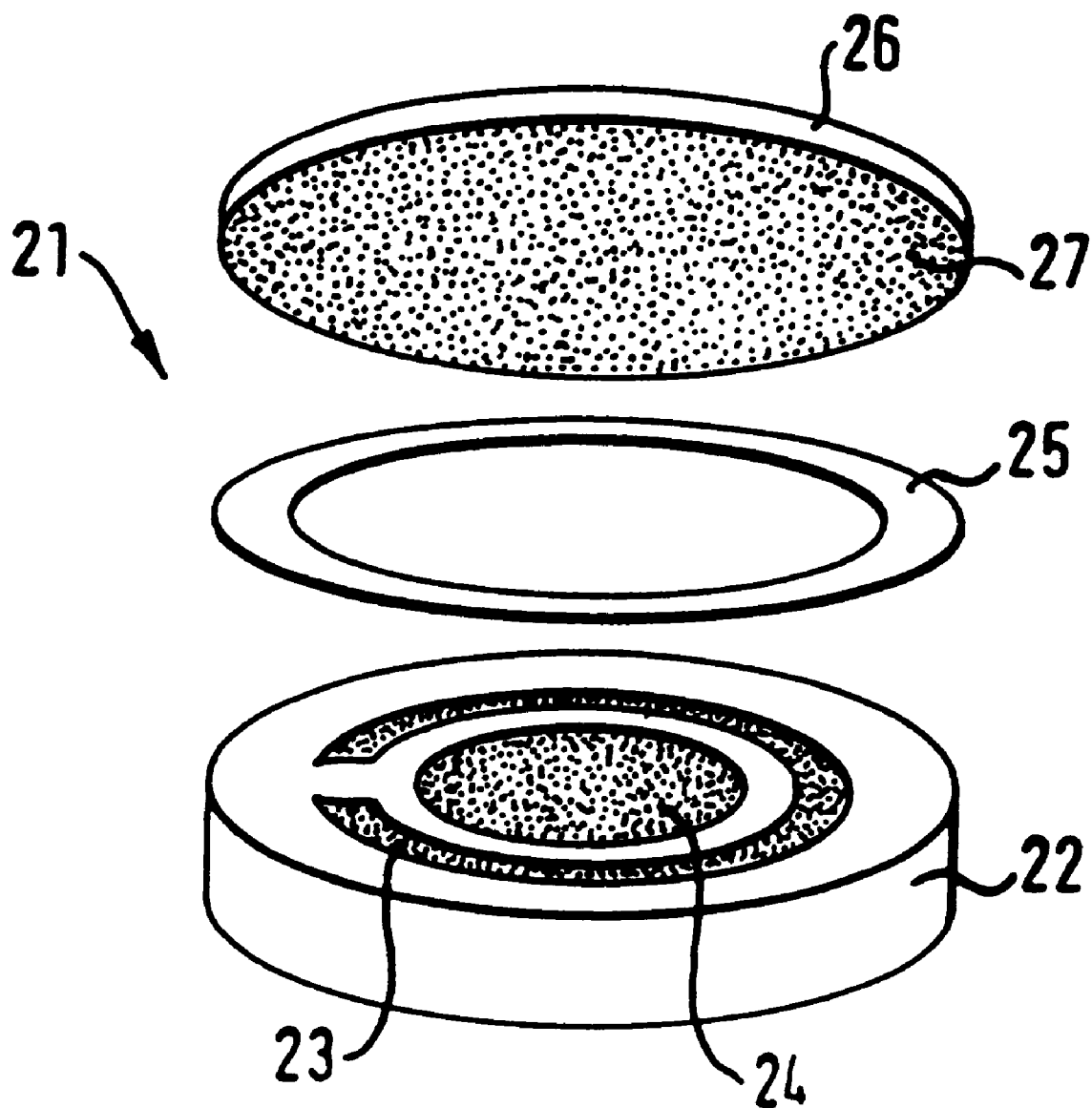
FIG. 5 is an exploded, perspective view of a pressure sensor.

FIG. 5 shows the principle configuration of a pressure sensor 21. The pressure sensor 21 is formed of a basebody 22 in which a $C_R$ electrode 23 and a $C_P$ electrode 24 are disposed. The basebody 22 is connected through a spacer 25 to a diaphragm 26 which in turn includes an opposing electrode 27. In the present exemplary embodiment the basebody 22, the spacer 25 and the diaphragm 26 are made of a ceramics material.

The operation and functioning of the sensing device in accordance with the invention will now be described. In order to determine the pitot and static pressure in flight, air enters in the air intake ports 30, which are provided in the wall 13 of the radome 10. The air entering the air intake ports 30 is directed through the connecting passages or tubes 31 to the pressure sensors 21. In this configuration the connecting passages 31 are in direct contact with both the air intake ports 30 and the pressure sensors 21. The air flowing through the connecting passages 31 impinges on the diaphragm 26 of the pressure sensor 21 at the end of the connecting passages 31, as a result of which the diaphragm 26, which is spaced away from the basebody 22 by the spacer 25, is bulged in the direction of the basebody 22. The basebody 22 is componented with the electrodes 23, 24 and the diaphragm 26 contains the opposing electrode 27. Due to the electrodes 23, 24 being spatially separated from each other by the spacer 25, the configuration of the pressure sensor 21 corresponds to that of a capacitor. Due to the displacement of the diaphragm 26 in the direction of the basebody 22 and thus the displacement of the opposing electrode 27 in the direction of the electrodes 23, 24, a capacitance defined by the electrode surfaces is varied. Since the displacement of the diaphragm 26 depends on the air pressure existing in the connecting passage 31, the change in capacitance between the electrodes 23, 24 is proportional to the change in air pressure. Thus, the pressure sensor 21 is suitable for converting the respective existing air pressure into an electric signal.

The electric signals which are produced in this way by the pressure sensors 21 are relayed to the electronic analyzer 40 which has a redundant configuration. This electronic analyzer 40 is disposed just behind the circular disk magazine 20 for the pressure sensors 21 and contains all of the electrical components necessary for analyzing and passing on these electric signals. In the present exemplary embodiment the electronic analyzer 40 includes the microprocessor 42 in which all of the necessary air data parameters are derived from the sensed pitot and static pressure by real-time-related algorithmic computation. These relevant air data parameters are more particularly altitude, speed, Mach number, angle of attack and side-slip. The values computed by the microprocessor 42 are supplied as digital signals to the signal converter 43. The electrical output signals of the microprocessor 42 are converted into optical signals in this signal converter 43. These resulting optical signals can be simply relayed by fiber optic cable to the flight control computer of the fighter aircraft for further processing and utilization.

In the case of the sensing device as described above, the wall 13 of the radome 10 or the air intake ports 30 may ice up during flight. Such an icing up would be detrimental to proper functioning of the sensing device and would falsify the results. It is for this reason that the sensing device in accordance with the invention is equipped with the heater 50. This heater 50 is formed of the heating element 51 which in the present exemplary embodiment is operated electrically. The electric heating element 51 is connected through the heating conductors 52, 53 to a suitable non-illustrated power supply. The heating element 51 is disposed on the inner surface of the wall 13 of the radome 10. Due to the fact that the radome 10 is produced from a heat-conductive material, upon actuation of the heating element 51 the heat produced therein is transmitted to the radome 10 and thus to the air intake ports 30. Icing up of the radome 10 or the air intake ports 30 is prevented through the use of the heater 50.

As is shown in FIG. 1 both the magazine 20 for the pressure sensors 21 and the electronic analyzer 40 are disposed in the portion of the radome 10 which is largest in diameter. In the case of the present exemplary embodiment this is the terminating portion of the radome 10. This makes it possible to accommodated as many pressure sensors 21 as possible, in the present case eleven, in the magazine 20. As a result the accuracy and reliability of the sensing device in accordance with the invention is enhanced. In order to avoid wasting valuable space for placement of the pressure sensors 21 in the radome 10, the respective through-holes 28 and 41 are respectively provided within the magazine 20 and the electronic analyzer 40. In this configuration the through-holes 28 of the magazine 20 are not disposed in a mounting portion of the pressure sensors 21. Since the through-holes 28, 41 serve to mount the heating conductors 52, 53 that are necessary for supplying power to the heating element 51, the space available within the radome 10 is optimally utilized by the above-described configuration of the heating conductors 52, 53.

Through the use of the present invention it is possible to define a device for sensing pitot and static pressures in an aircraft, more particularly in a fighter aircraft, with which safe and reliable functioning is assured even in the case of high angles of attack.

We claim:

1. In an aircraft having a fuselage and a radome having a wall rigidly attached to the fuselage, an aircraft pitot and static pressure sensing device, comprising:

a multiplicity of pressure sensors disposed in a radome;

a multiplicity of air intake ports formed in a wall of the radome; and connecting passages connecting said multiplicity of air intake ports to said multiplicity of pressure sensors.

2. The sensing device according to claim 1, wherein the radome has a wall, a periphery and a longitudinal direction, and said air intake ports are disposed in said wall and offset about the periphery and in the longitudinal direction of the radome.

3. The sensing device according to claim 1, wherein the radome has a wall and a periphery, and said air intake ports are disposed in said wall and offset about the periphery of the radome.

4. The sensing device according to claim 1, wherein the radome has a wall and a longitudinal direction, and said air intake ports are disposed in said wall and offset in the longitudinal direction of the radome.

5. The sensing device according to claim 1, including a circular disk magazine in which said pressure sensors are disposed.

6. The sensing device according to claim 5, including an electronic analyzer connected to said pressure sensors, a heater having a heating element for heating the radome and said air intake ports, and at least one heating conductor connected to said heating element and passing through through-holes in said circular disk magazine and through-holes in said electronic analyzer.

7. The sensing device according to claim 1, wherein said pressure sensors are cylindrical.

8. The sensing device according to claim 1, wherein said pressure sensors include a basebody having at least one $C_R$ electrode and one $C_P$ electrode, a spacer, and a diaphragm with an opposing electrode.

9. The sensing device according to claim 8, wherein said basebody, said spacer and said diaphragm are formed of a ceramics material.

10. The sensing device according to claim 1, wherein each of said pressure sensors is connected through at least one of said connecting passages to each of said air intake ports.

11. The sensing device according to claim 1, wherein said connecting passages are connecting tubes and drilled passages.

12. The sensing device according to claim 1, wherein said connecting passages are connecting tubes.

13. The sensing device according to claim 1, wherein said connecting passages are drilled passages.

14. The sensing device according to claim 1, including eleven of said pressure sensors.

15. The sensing device according to claim 1, including an electronic analyzer connected to said pressure sensors.

16. The sensing device according to claim 15, wherein said electronic analyzer has a redundant configuration.

17. The sensing device according to claim 15, wherein said electronic analyzer is disk-shaped and disposed in the immediate surroundings of said pressure sensors in the radome.

18. The sensing device according to claim 15, wherein said electronic analyzer includes at least one microprocessor for processing signals from said pressure sensors and outputting electric signals, and a signal converter connected to said microprocessor for converting the electric signals from said microprocessor into optical signals.

19. The sensing device according to claim 1, including a heater.

20. The sensing device according to claim 19, wherein said heater includes a heating element for heating the radome and said air intake ports, and at least one heating conductor connected to said heating element.

21. The sensing device according to claim 19, wherein said heater is an electrical heater.

22. The aircraft according to claim 1, including a device for protecting against lightning.

23. The aircraft according to claim 1, wherein said radome arrests lightning current.

24. An aircraft having a fuselage, comprising:

a radome having a wall connected to a fuselage, said radome formed of a material resistant to erosion; and a pitot and static sensing device including a multiplicity of pressure sensors disposed in said radome, a multiplicity of air intake ports formed in said wall of said radome, and connecting passages connecting said air intake ports to said pressure sensors.

25. The aircraft according to claim 24, including a fuselage and a Teflon bush connecting said radome to said fuselage.

26. The aircraft according to claim 25, including a device for eliminating sensitivity to high frequencies.

27. The aircraft according to claim 24, wherein said radome acts as a Faraday cage for eliminating sensitivity to high frequencies.

* * * * *